US009143233B2

(12) United States Patent
Hurwitz et al.

(10) Patent No.: US 9,143,233 B2
(45) Date of Patent: Sep. 22, 2015

(54) INTERCOM TRANSCEIVER WITH FIBER OPTIC LINK

(71) Applicant: Miranda Technologies Partnership, Montreal (CA)

(72) Inventors: James Bennett Hurwitz, Mill Valley, CA (US); David Charles Pelletier, Southbridge, MA (US)

(73) Assignee: MIRANDA TECHNOLOGIES PARTNERSHIP, Montreal (CA)

( * ) Notice: Subject to any disclaimer, the term of this patent is extended or adjusted under 35 U.S.C. 154(b) by 89 days.

(21) Appl. No.: 13/801,309

(22) Filed: Mar. 13, 2013

(65) Prior Publication Data

US 2013/0287400 A1    Oct. 31, 2013

Related U.S. Application Data

(60) Provisional application No. 61/638,885, filed on Apr. 26, 2012.

(51) Int. Cl.
| | | |
|---|---|---|
| *H04B 10/00* | (2013.01) | |
| *H04B 10/25* | (2013.01) | |
| *H04B 10/2575* | (2013.01) | |
| *H04M 11/02* | (2006.01) | |

(52) U.S. Cl.
CPC ........ *H04B 10/2503* (2013.01); *H04B 10/2575* (2013.01); *H04B 10/25751* (2013.01); *H04M 11/025* (2013.01); *H04J 2203/0001* (2013.01)

(58) Field of Classification Search
CPC ... H04B 10/25–10/299; H04Q 11/00–11/0005
See application file for complete search history.

(56) References Cited

U.S. PATENT DOCUMENTS

| | | | | | |
|---|---|---|---|---|---|
| 3,423,532 | A | * | 1/1969 | Stewart et al. | 379/164 |
| 3,548,108 | A | * | 12/1970 | Tashiro et al. | 370/319 |
| 4,281,315 | A | * | 7/1981 | Bauer et al. | 340/9.1 |
| 4,572,928 | A | * | 2/1986 | Nishimura et al. | 379/159 |
| 4,601,064 | A | * | 7/1986 | Shipley | 398/127 |
| 5,022,069 | A | * | 6/1991 | Chen | 379/67.1 |
| 5,825,868 | A | * | 10/1998 | Diamond | 379/243 |
| 6,091,956 | A | * | 7/2000 | Hollenberg | 455/456.5 |

(Continued)

FOREIGN PATENT DOCUMENTS

| | | | | | |
|---|---|---|---|---|---|
| CA | 1185022 | | * | 4/1985 | H04J 1/02 |
| CA | 1185022 | A1 | | 4/1985 | |

OTHER PUBLICATIONS

Telex; Handbook of Intercom Systems Engineering, Apr. 4, 2007.*

(Continued)

*Primary Examiner* — Li Liu
(74) *Attorney, Agent, or Firm* — Foley & Lardner LLP

(57) ABSTRACT

A system and method for carrying a downstream optical signal and an upstream optical signal on a fiber optic link is disclosed. The system and method includes a first transceiver unit that receives an input communication signal from at least one external communication device at an electrical input port, a transmitter that converts the input communication signal into an optical signal and transmits the optical signal as an downstream optical signal on a fiber optic link, a receiver at the second transceiver unit that receives the downstream optical signal and converts the downstream optical signal into an electrical communication signal, and a first circuit in the second transceiver unit that determines whether the second transceiver couples the electrical communication signal to a two wire intercom circuit or a four wire intercom circuit.

19 Claims, 7 Drawing Sheets

(56) References Cited

U.S. PATENT DOCUMENTS

| | | | | |
|---|---|---|---|---|
| 6,115,159 | A * | 9/2000 | Baker | 398/1 |
| 7,409,052 | B1 * | 8/2008 | Schilsky et al. | 379/167.02 |
| 2003/0112338 | A1 * | 6/2003 | Pelletier et al. | 348/211.99 |
| 2004/0131357 | A1 * | 7/2004 | Farmer et al. | 398/67 |
| 2005/0117913 | A1 * | 6/2005 | Hung et al. | 398/139 |
| 2007/0130246 | A1 * | 6/2007 | Lau et al. | 709/200 |
| 2007/0211705 | A1 * | 9/2007 | Sunstrum | 370/356 |
| 2013/0162845 | A1 * | 6/2013 | Wordsworth et al. | 348/207.1 |

OTHER PUBLICATIONS

International Search Report and Written Opinion for PCT/US2013/037621 dated Oct. 2, 2013 (22 pages).

Iascomm: "Optical Ethernet Switches, Ethernet Media Converters and Other Fiber Optic Ethernet Equipment", Jan. 1, 2005, pp. 1-3, URL: www.Iascomm.com/ethernet.html.

International Preliminary Report on Patentability for Application No. PCT/US2013/037621 dated Nov. 6, 2014, 7 pages.

* cited by examiner

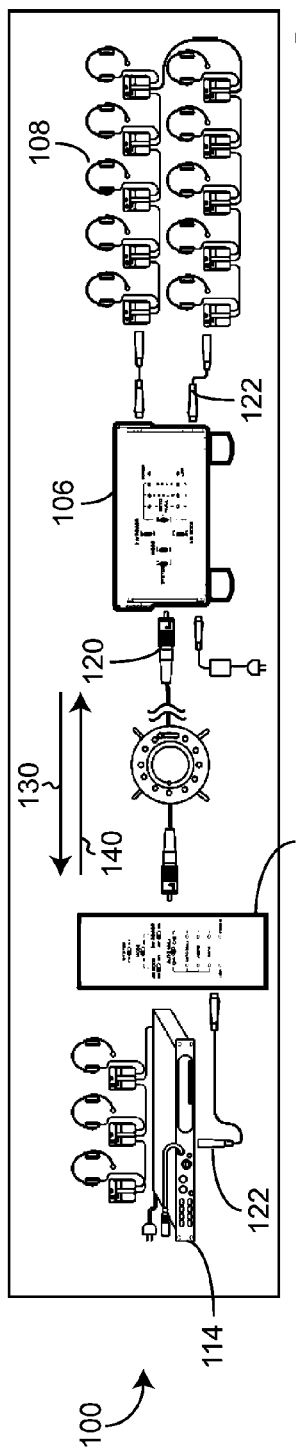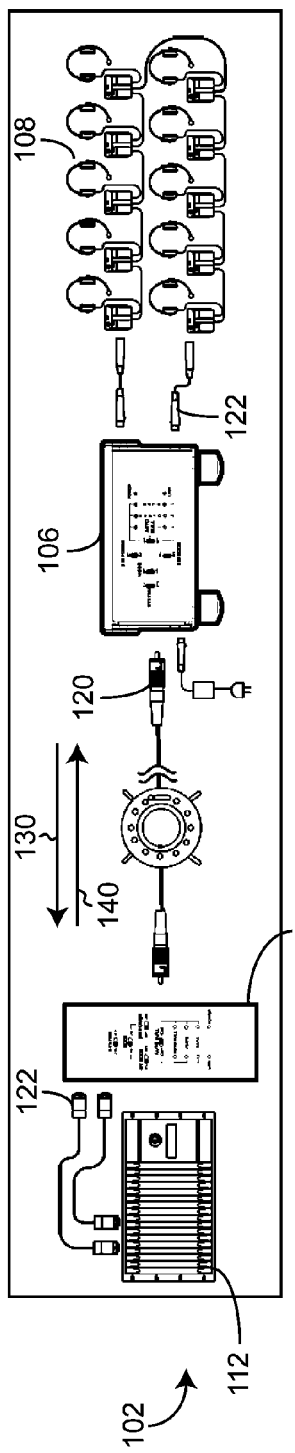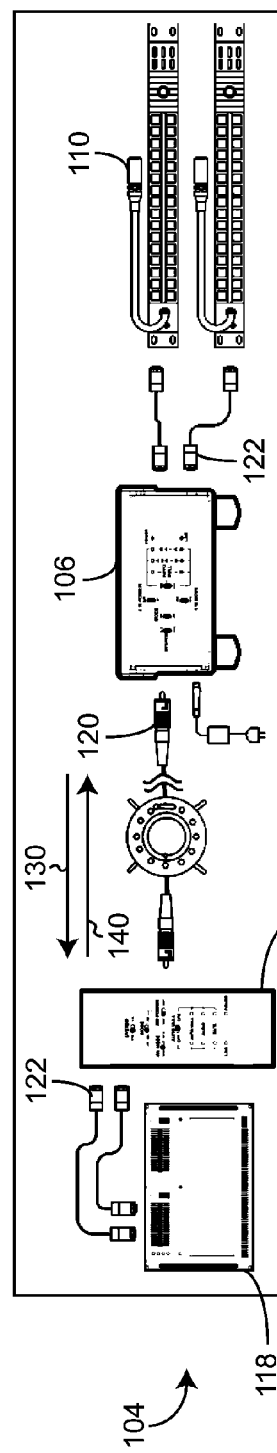

INTERCOM TRANSCEIVER WITH FIBER OPTIC LINK

CROSS-REFERENCE TO RELATED APPLICATION

This application claims priority to U.S. Provisional Application No. 61/638,885, filed on Apr. 26, 2012, which is incorporated by reference herein in its entirety.

BACKGROUND

Television broadcast professionals often require the ability to extend one or two channels of voice intercom systems over a long distance. This functionality is required so that certain key production personnel at a remote location can communicate with the rest of the production team on site reliably, clearly, and with full access to the intercom system's functions, including those functions over and above the simple bi-directional transmission of voice communications. Specific television broadcast applications include "outside broadcast" such as sporting, entertainment, or event production, terrestrial (ENG) and satellite (SNG) news gathering, corporate events, and industrial testing environments.

These voice communications may be transmitted and received according to a "two-wire" or "four-wire" format. The two-wire format allows users connected to a communication line to communicate with other users connected to the communication line at any given time. Four-wire communication allows users connected to a communication line to selectively communicate privately with other specific users on a one on one basis. The four-wire formats may include a connection matrix that allows any user connected to the matrix to communicate privately with any other user connected to the matrix. Accordingly, two-wire and four-wire communication lines can operate under separate communication formats and typically require separate hardware units and/or communication lines.

SUMMARY

One embodiment described herein relates to a system for carrying a downstream optical signal and an upstream optical signal on a fiber optic link between a first transceiver unit coupled to a first intercom system and a second transceiver unit coupled to a second intercom system. The system includes a first transceiver unit that receives an input communication signal from at least one external communication device at an electrical input port, a transmitter that converts the input communication signal into an optical signal and transmits the optical signal as a downstream optical signal on a fiber optic link coupled between the first transceiver unit and the second transceiver unit, a receiver at the second transceiver unit that receives the downstream optical signal and converts the downstream optical signal into an electrical communication signal, a first circuit in the second transceiver unit that determines whether the second transceiver couples the electrical communication signal to a two wire intercom circuit or a four wire intercom circuit, and an output port on the second transceiver unit that outputs either a two wire intercom signal or a four wire intercom signal to an external communication device based on the first circuit determination.

Another embodiment described herein relates to a method of carrying an downstream optical signal and an upstream optical signal on a fiber optic link between a first transceiver coupled to a first intercom system and a second transceiver coupled to a second intercom system. The method includes receiving an input communication signal from at least one external communication device at an electrical input port of a first transceiver unit, converting the input communication signal into an optical signal, transmitting the optical signal as a downstream optical signal on a fiber optic link coupled between the first transceiver unit and the second transceiver unit, receiving the downstream optical signal at the second transceiver unit, converting the downstream optical signal into an electrical communication signal, coupling the electrical communication signal to one of a two wire intercom circuit and a four wire intercom circuit determined by a first circuit in the second transceiver unit, and transmitting one of a two wire intercom signal or a four wire intercom signal to an external communication device based on the first circuit determination.

BRIEF DESCRIPTION OF THE DRAWINGS

Exemplary embodiments are hereafter described, wherein like reference numerals denote like elements, and:

FIG. 1A is a schematic diagram depicting a communication system between two transceiver units according to one exemplary embodiment;

FIG. 1B is a schematic diagram depicting a communication system between two transceiver units according to one exemplary embodiment;

FIG. 1C is a schematic diagram depicting a communication system between two transceiver units according to one exemplary embodiment;

DETAILED DESCRIPTION OF THE PREFERRED EMBODIMENTS

Figure 2:
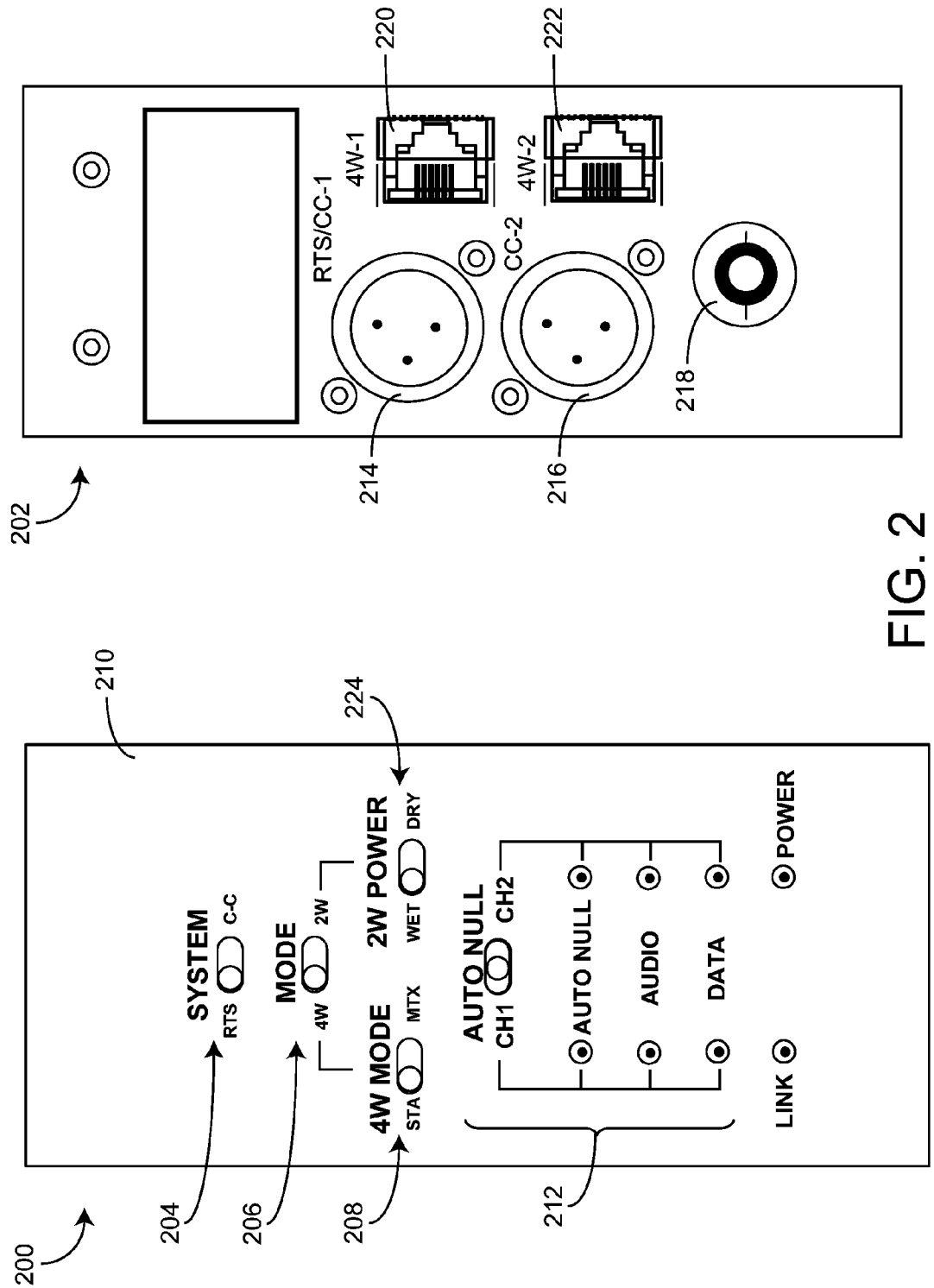
FIG. 2 is a schematic diagram of a transceiver unit according to one exemplary embodiment.
Figure 3:
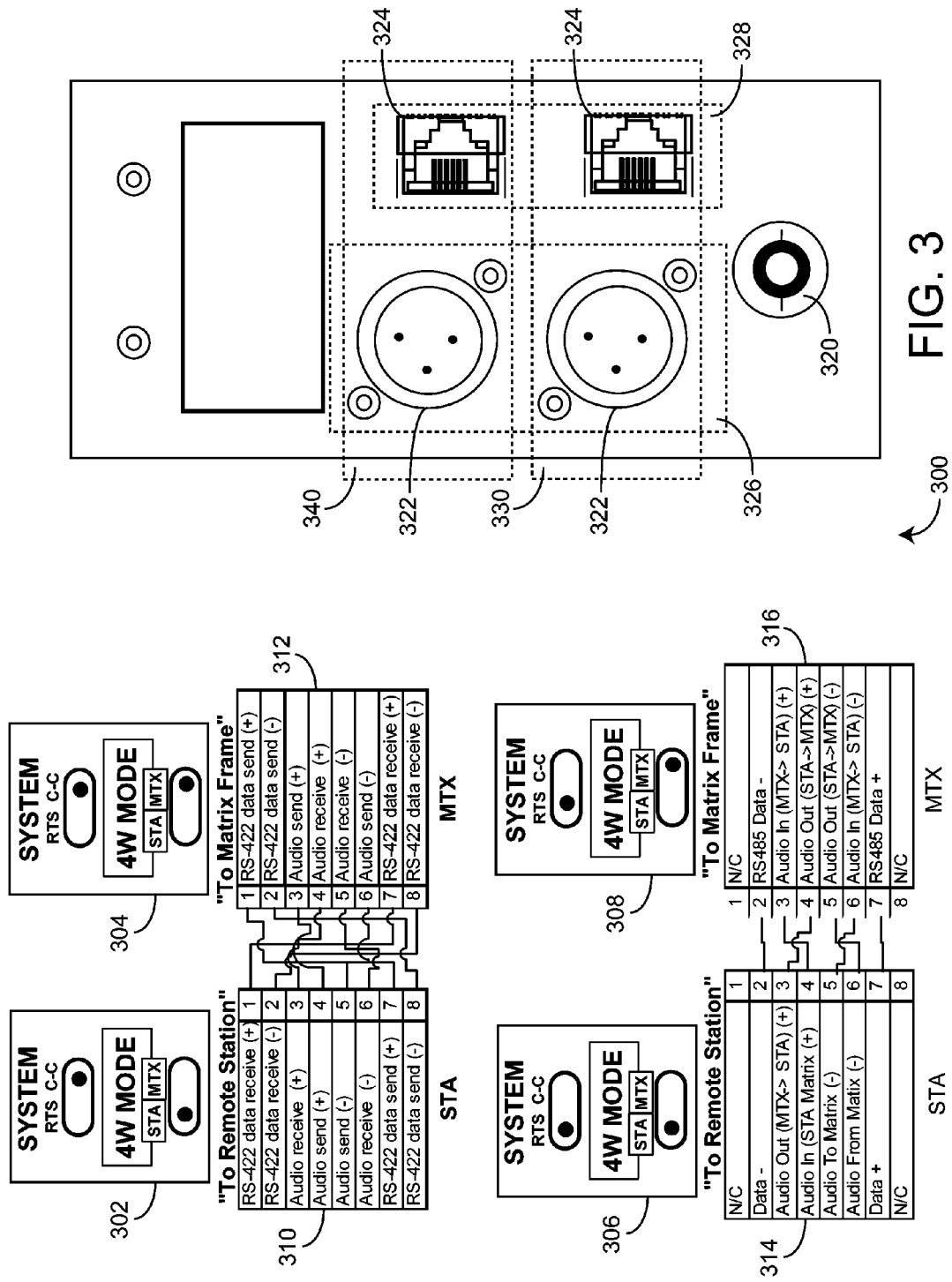
FIG. 3 is a diagram depicting the relationship between external switches and connections between input and output pins on a transceiver unit according to some embodiments.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring to FIGS. 1A, 1B, and 1C, several embodiments 100, 102, and 104 of bi-directionally communicating data such as intercom audio data between two transceiver units across an optical fiber link 120 is shown. One or more embodiments may overcome distance limitations and electrical interference problems associated with copper wire cabling by implementing a fiber optic link a communication link in place of or in addition to traditional copper cables. Fiber optic links provide several advantages including increased bandwidth, reliability, immunity electrical interference, and the ability to multiplex several different types of data signals such as HD/SDI onto the same fiber strand. Furthermore, one or more embodiments may overcome communication interoperability limitations between a first transceiver unit and a second transceiver unit by providing a fiber optic communication system capable switching between a two-wire four wire communication formats, switching between communication protocols received at a first transceiver unit and a second transceiver unit, and providing variant power settings required at the first transceiver unit and the second transceiver unit.

In general, 100, 102, and 104 depict bidirectional transmission systems that may be used in signal broadcast applications such as television production, event production, terrestrial electronic news gathering (ENG), satellite news gathering (SNG), corporate events, and industrial testing environments, for example. Such broadcasting applications may extend audio channels of intercom systems over a long distance. This functionality is provided so that certain key production personnel at a remote location, such as a production center, can communicate with the rest of the production team on site reliably, clearly, and with full access to the intercom audio signals, intercom system functions, and/or additional data signals such as HD video signals from an on site video camera, for example. Accordingly, the fiber optic transceiver systems 100, 102 and 104 may bi-directionally transmit two channels of intercom communications from a transceiver 106 or 116 to a second transceiver 116 or 106 over a fiber optic link 120.

For example, referring to fiber optic transceiver system 100, a first audio intercom channel may be received from external communication device 108, comprising headset intercom devices at a first transceiver unit 106 via connectors 122. According to some embodiments, the portable headset intercom devices 108 include a belt-pack, microphone, and headset speakers distributed along a standard microphone cable. According to some embodiments, external communication device 108 is considered a two-wire or "party-line" external communication device. According to some embodiments, two-wire communication devices connect multiple users to a communication line, such as a microphone cable, allowing each user to send and receive audio data using the communication line. Furthermore, two-wire external communication devices, such as two-wire intercoms, may include a full-duplex communication line capable of allowing each user functionally connected to the communication line to both send and receive audio data to any other user on the same communication line simultaneously. The system components for some party-line intercoms consist of power supplies, user stations (e.g. belt packs, speaker stations, main stations, etc.), interconnecting cable, headsets, panel microphones, push-to-talk microphones, and a system termination.

Figure 4A:
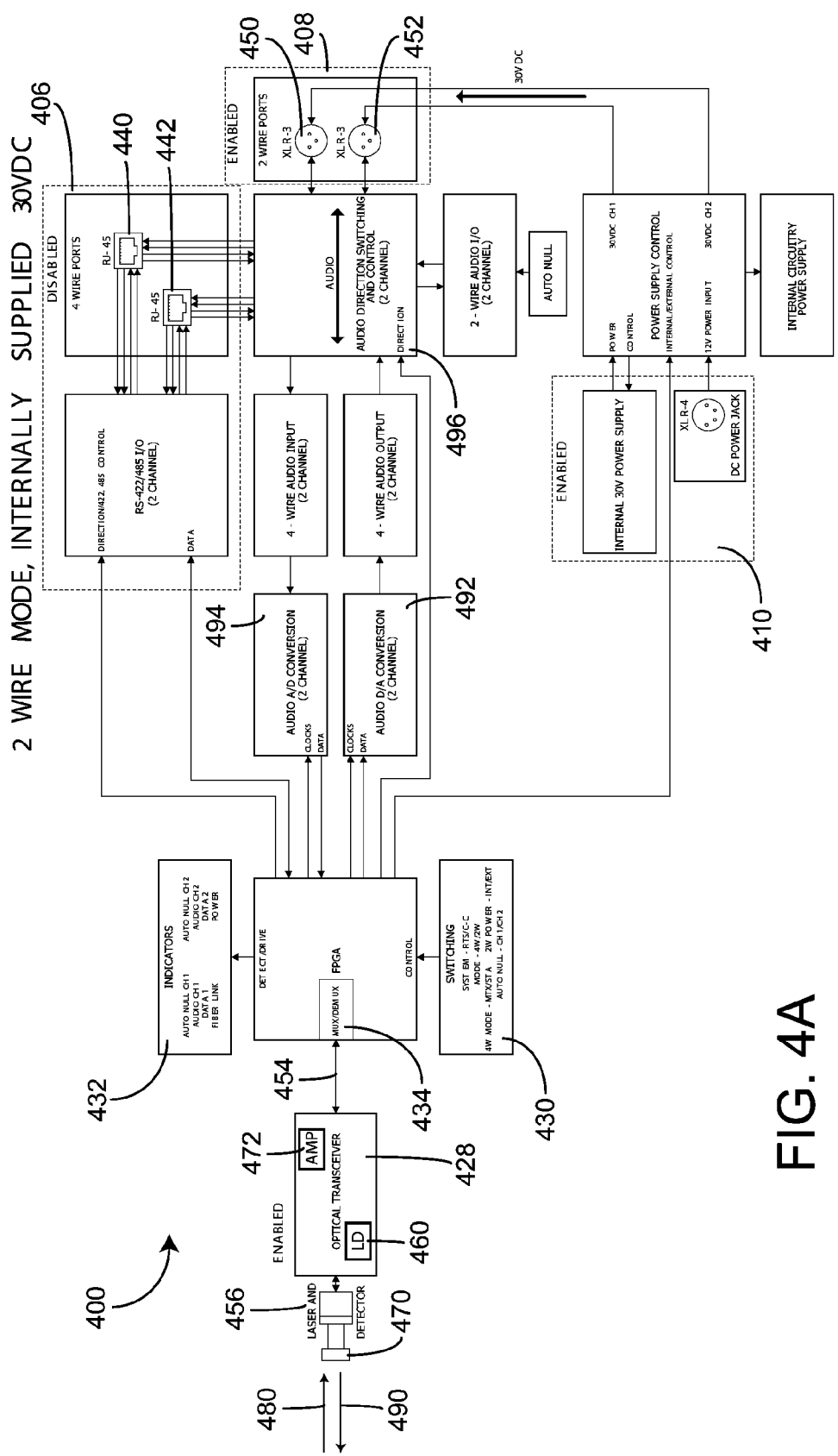
FIG. 4A is a schematic diagram depicting the internal circuitry of a transceiver unit according to a selected setting according to one exemplary embodiment.

Referring now to FIG. 4A, circuitry within a transceiver unit for processing the audio data will be described in an exemplary embodiment. After the audio data, such as two wire audio data, from external communication device 114 (FIG. 1) is received at transceiver unit 116, the audio data may be digitized at an A/D converter 494 as shown in FIG. 4A. Furthermore, A/D converter 494 is coupled to a multiplexer circuit 434, shown in exemplary form as a portion of a field programmable gate array (FPGA) which time division multiplexes the audio signal, for example, with additional data such as clock data, or a video camera data signal.

The output of the multiplexer 434 is a serial bit stream 454 that is coupled to a laser diode driver circuit 460 included in optical transceiver unit 428. Accordingly, the laser driver circuit 428 drives a laser diode that performs an optical to electrical (O/E) conversion on the electrical serial bit stream 454. Once the multiplexed serial bit stream 454 has been converted to an upstream optical signal 490, the upstream optical signal will be transmitted across fiber link 120, as shown in FIGS. 1A, 1B, and 1C to the second transceiver unit 116.

As shown in FIG. 4A, for example, the laser diode 456 may be coupled to a wavelength division multiplexer (WDM) 470. The upstream optical signal 490 produced by the laser diode may be produced at a first wavelength $\lambda_1$, such as 1310 nm, for example. In the opposite direction, the downstream optical signal 480 transmitted from transceiver unit 116 is received at WDM 470. According to some embodiments, the downstream optical signal 480 is at a second wavelength $\lambda_2$, such as 1550 nm. The terms upstream and downstream are used to distinguish a transmitting transceiver from a receiving transceiver for the purposes of illustration. Accordingly, the directions of upstream and downstream are interchangeable. In general, the optical wavelengths are preferably selected from wavelengths in the range of 1300 nm to 1550 nm. The WDM 470 splits the optical signals $\lambda_1$ and $\lambda_2$. In another embodiment, the WDM 470 can instead be a two-way coupler, in which case $\lambda_1 = \lambda_2$ with bi-directional transmission on a single optical fiber. It should be noted that while some embodiments employ wavelength division multiplexing to provide transmission of optical signals 130 and 140 on a single optical fiber, other embodiments can have a separate optical fiber for each direction of transmission. In such embodiments, the wavelength division multiplexing is not employed, and $\lambda_1$ can be the same as or different than $\lambda_2$.

Referring to FIGS. 1B and 1C, in addition to receiving two-wire audio intercom data, transceiver units may also be configured to receive four-wire audio intercom data from a four-wire external communication device such as matrix devices 112 or 118. Four wire audio systems, such as matrix devices 112, 118, differ from two wire systems in that such systems allow individuals functionally connected to a matrix device to establish audio connections with other individuals functionally connected to the matrix device. According to some embodiments, matrix devices 112, 118 receive multiple communication inputs from audio sources, such as headset microphones, at matrix input ports and also transmit out multiple communication outputs to audio receivers from matrix output ports, such as headset speakers. Matrix devices may establish communication paths between users functionally connected to a matrix device according to control signals sent to the matrix device by users functionally connected to the matrix device, or through software programs controlling the matrix device, for example.

Accordingly, large numbers of individuals connected to the four wire or matrix device have the ability to establish private individual conversations between users at user stations unlike some two wire or party line systems where any headset connected to a common microphone line can listen to any other headset. Matrix devices may have other functions and capabilities such as those found in telephone systems. Conferences, call waiting, busy signals, and other features may be used in matrix devices. In addition, user stations functionally connected to a matrix device can range in complexity from a simple microphone with a single push button and a loudspeaker to a fully programmable keypanel with an alphanumeric display, digital signal processing, user programmable features, volume controls, etc. According to some embodiments, matrix devices 112, 118 have a limited number of ports to both receive data from an external communication device and transmit data to an external communication device. In some embodiments, matrix devices 112, 118 have logical ports that consist of an audio input to the matrix, which is used to bring an audio signal from an individual at a user station, an audio output used to receive audio data from the user station, and a bi-directional data signal for control and status information between the matrix and the user station.

Figure 4B:
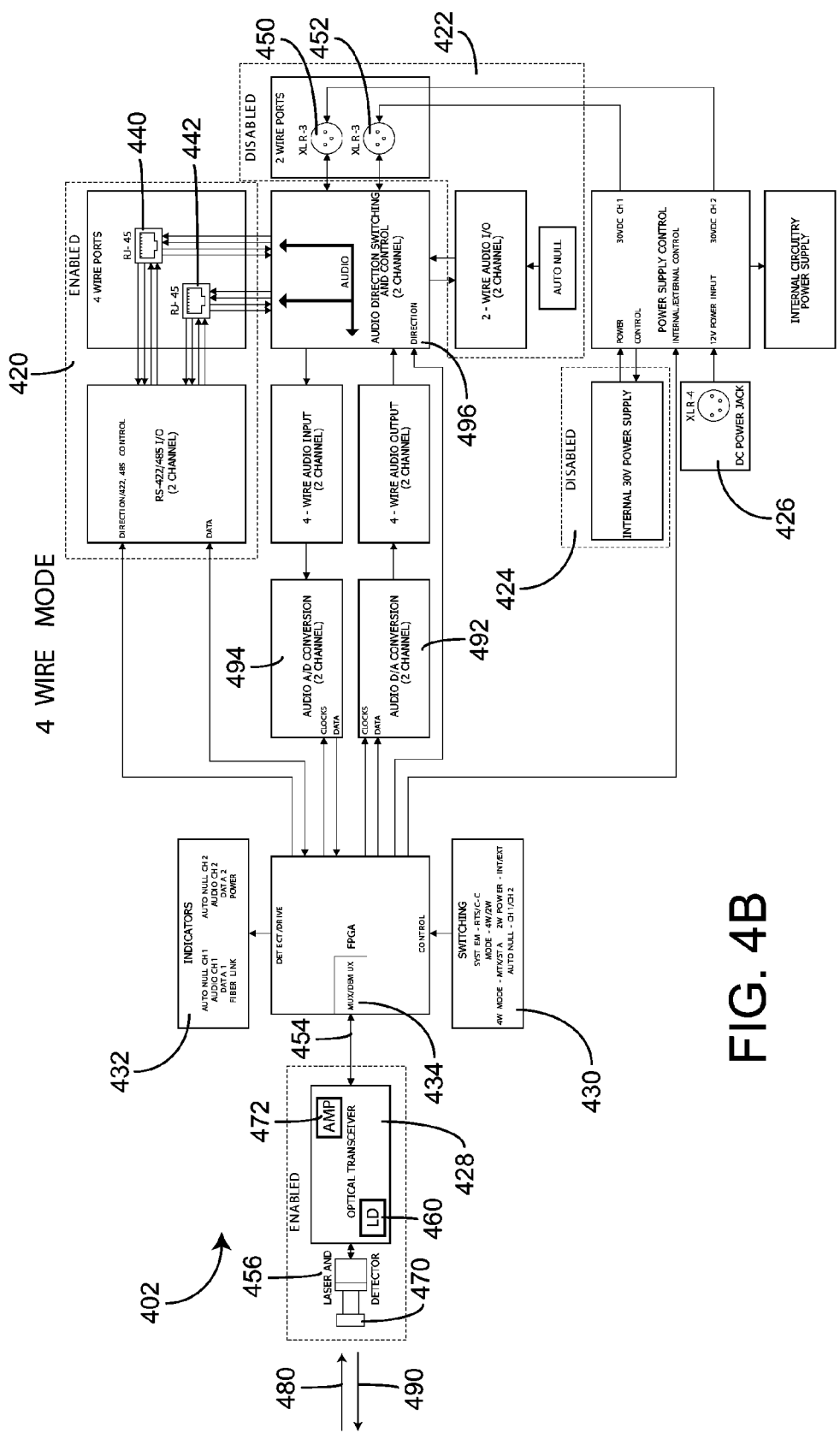
FIG. 4B is a schematic diagram depicting the internal circuitry of a transceiver unit according to a selected setting according to one exemplary embodiment.
Figure 4C:
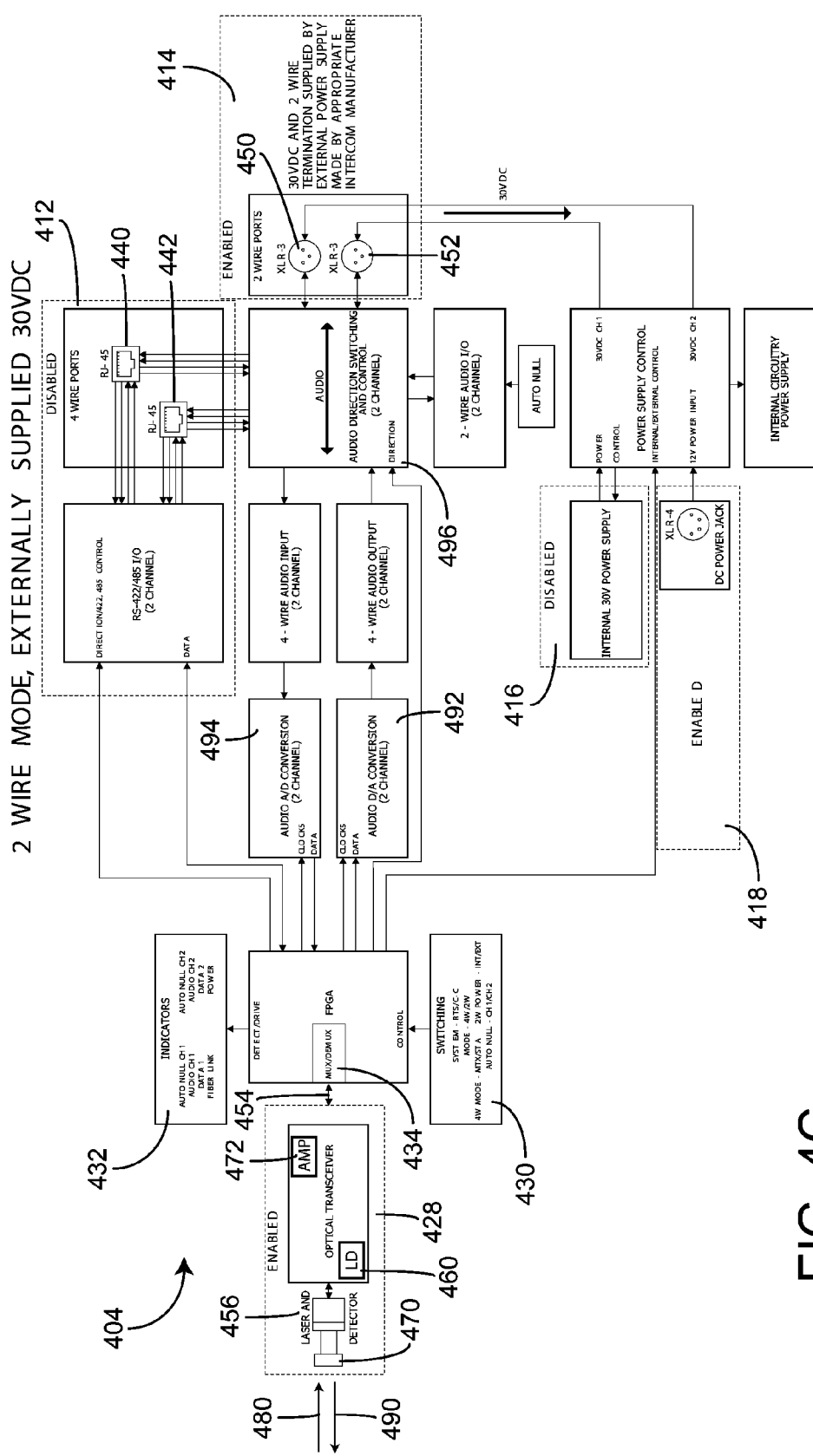
FIG. 4C is a schematic diagram depicting the internal circuitry of a transceiver unit according to a selected setting according to one exemplary embodiment.

As with a two wire intercom system 108, four wire intercom systems, such as matrix device 112, may transmit audio and control data to an input port of a transceiver unit, such as transceiver unit 116 via communication links 122. According to some embodiments, communication link 122 is inserted into four wire I/O ports of a first transceiver unit, such as transceiver unit 116, such as I/O ports 220 and 222, for example, as shown in FIG. 2. Furthermore, audio data from a matrix device may be multiplexed with control data, clock data, or video camera data at a transceiver unit multiplexer 434. As with two wire audio data, the output of the multiplexer 434 is a serial bit stream 454 that is coupled to a laser diode driver circuit. Accordingly, the laser driver circuit drives a laser diode that performs an optical to electrical (O/E) conversion on the electrical serial bit stream 454. Once the multiplexed serial bit stream 454 has been converted to a downstream optical signal 140, the downstream optical signal will be transmitted across fiber link 120, as shown in FIGS. 1A, 1B, and 1C to a second transceiver unit, such as transceiver unit 106. As shown in FIG. 4A, downstream optical signal 480, from a first transceiver unit 116, will be received at the WDM 470 of a second transceiver unit 106, while the upstream optical signal 490 from the second transceiver unit 106 will be received at a WDM of the first transceiver unit 116. Internal structures of transceiver units as shown in FIGS. 4A, 4B, and 4C are present in both first and second transceiver units on opposing sides of fiber link 120, according to some embodiments.

Once the upstream optical signal 480 is received at an input port of WDM 470, the optical signal will be converted from an optical signal to an electrical signal at detector 456, such as a photodetector, the output of which is provided to a demultiplexer. The digital output of the demultiplexer 434 may include audio data, control data, video data, and clock data, for example. According to some embodiments, the demultiplexed digital audio data is converted analog audio data and routed through switching circuitry 496 to an output port of the transceiver unit, such as two-wire port 450 for transmission to a two wire external communication device such as microphone line and belt pack device 108 or two channel two wire system 114.

As stated previously, transceiver units 116 and 106 may be used in a wide variety of situations and be used to connect a wide array of external communication devices including two wire external communication devices 108, 114, four wire external communication devices 110, 112, and 118, external communication devices manufactured by different companies, as well as communication devices with varying power requirements. Accordingly, transceiver units 106 and 116 are equipped with external switches 204, 206, 208 and 224 located on an exterior surface of the transceiver units 200 as shown in FIG. 2. The external switches allow for electrical coupling between various circuits internal to transceiver units 106 and 116, for example, as shown in FIGS. 4A, 4B, and 4C.

According to one exemplary embodiment, external switches couple or decouple power sources to external communication devices. According to some embodiments, external switches 204, 206, 208 and 224 allow a four wire external communication device 112 connected to transceiver unit 116 to communicate with a two wire external communication device 108 connected to transceiver unit 106 by electrically coupling circuits compatible with the external communication device connected to each transceiver unit. Transceiver units may receive communication links 122 from external communication devices at input/output (I/O) ports 212, 216, 220, and 222 as shown on another exterior surface 202 of transceiver units 116 and 106. Exterior surface 202 may include several I/O ports compatible with various external devices, according to some embodiments. An exterior surface of the transceiver units 116 and 106 may also include an I/O port for fiber optic link 120. Furthermore, exterior surfaces may also include lights 212, such as LED lights, to monitor various data connectivity and power supply conditions. Users may use lights 212 to determine if communication links are not properly transmitting or receiving data. As shown in FIG. 2, switches 204, 206, 208 and 224 are all disposed on a single housing, along with input/output ports 212, 216, 220, and 222, and the circuit components coupled to these elements are all disposed within a single housing. According to one exemplary embodiment, all elements described as being within or on a single transceiver unit are within or on a single housing. One or more of these elements may be disposed on single side or face of the housing, or on different sides in alternative embodiments.

Furthermore, if a transceiver unit is being connected to a four wire external communication device such as a device 112, a user will move "mode" switch 206 to the 4 W position, as shown in FIG. 2. Furthermore, the user may also move the "system" switch 204 to a position indicating the manufacturer of the external communication device. The system switch 204 may electrically couple circuits within transceiver unit 116 or 106 that are compatible with a particular manufacturers communication protocol and pin out designations, for example. In addition, "4 W mode" switch 208 electrically couples circuitry compatible with the type of four wire mode device being used such as a station device or a matrix frame device.

In addition, if the two wire mode option is selected at switch 206, a user must further select a power mode for the two wire external communication device coupled to the transceiver unit at switch 224, according to some embodiments. The power mode selection of "wet" or "dry" refers to whether power is being supplied to the external communication device, such as two wire device 108. According to some embodiments, if power is being supplied to an external communication device, the "wet" option is selected, and if power is not being supplied, the "dry" option is selected. The dry option may be selected because power is being supplied to the external communication device from an alternate source. Although exterior surface 200 depicts two options for each external switch, three, four, or more options may be implemented for each external switch, to accommodate various manufacturers and matrix devices, for example.

According to one exemplary embodiment, a user connecting a four wire station device manufactured by a first company, such as RTS™ for example, would select the switch positions as shown on transceiver exterior surface 200 as shown in FIG. 2. RTS™ is one of a variety of companies that produce communication devices such as intercom devices or external communication devices that may be operatively connected to transmission systems 100, 102, and 104, for example, as external communication devices 108, 110, 112, 114, and 118. Four wire devices such as station devices and matrix devices may connect to I/O ports 220 and 222 designed for four wire devices, for example. According to some embodiments, transceiver exterior 202 includes I/O ports 220 and 222 that accept various connectors compatible with four wire devices, such as registered jack (RJ) modular connectors. Connectors such as RJ connectors have varying pin out counts and pin designations. For example, the RJ45 connector uses 8 pins or electrical contacts, where each of the 8 pins or electrical contacts may be designated for data such as audio in, audio out, control data in and control data out. Each manufacturer of external communication devices may designated different data for each of the connector pins or electrical contacts.

For example, for a user connecting a transceiver unit to a four wire station device manufactured by a second company, such as Clear-Com® for example, the switch combination shown in element 302 would be selected. Clear-Com® station devices are designed to be used with RJ connectors with the pin out designations as shown in table 310. FIG. 4B shows the internal circuitry of a transceiver unit when switch combination 302 is selected. According to some embodiments, when mode switch 206 is designated as being in four wire mode, circuit 420 is electrically coupled to the audio switching and control circuit 496, denoted by the "enabled" designation in FIG. 4B. According to some embodiments, the FPGA is programmed to receive one or more input control signals from external switch circuitry 430 and transmit control signals to various circuits such as circuit 496 to electrically couple a received or transmitted serial bit signal 454 to I/O ports 440, 442, 450, and 452, located at circuits 420 and 422, for example. According to some embodiments, the control signal transmitted from the FPGA or other processing circuit is used at circuits such as circuit 496 to change the position of a switch that alters electrical coupling between various circuits.

According to some embodiments, when mode switch 206 selects a two wire mode, the FPGA transmits a control signal to circuit 408 to electrically couple received multiplexed data 454 to two wire circuit 408 containing two wire ports 450 and 452, so that the data contained in optical signal 480 can effectively be communicated to an external communication device connected to a two wire I/O port at the transceiver unit shown in FIG. 4A, for example. Similarly, in four wire mode, FPGA control circuit may transmit control data to circuit 420 and/or circuit 496 to communicate the pin out designations shown in tables 310, 312, 314, and 316 associated with various systems and mode combinations that may be selected on transceiver unit exterior shown by elements 302, 304, 306 and 308 to transmit to and receive the proper audio and data channels from multiplexer/demultiplexer 434.

Furthermore, I/O ports 322 and 324 may be designed to be compatible with connectors associated with particular two wire and four wire connectors. As stated above, four wire external communication devices may be limited to using the I/O ports designated by box 328, which are designed to receive RJ connectors, while ports designated by box 326 may be limited to receiving two wire type connectors, such as XLR connectors, according to some embodiments. For example, three pin XLR connectors may provide power, audio and return connections to a microphone cable and handset combination 108. As in the case of the four wire pin designations shown in tables 310, 312, 314 and 316, manufacturers of two wire XLR connectors may also assign variant pin designations that are accounted for by providing separate I/O ports 322. In addition, I/O ports may be aligned such that particular rows of I/O ports, whether for a two-wire connection or a four wire connection are assigned to a particular manufacturer such as box 340 devoted to RTS™ manufactured devices, and box 330 devoted to Clear-Com® manufactured devices, for example.

In addition, when two wire mode is selected at external switch 206, a user may additionally select an option of powering an external two wire communication device by selecting "wet" on external switch 224. This switch selection prompts the FPGA, as shown in FIG. 4A, to send a control signal to the power supply control circuit to electrically couple power supplies to output pins on two wire ports 450 and 452. According to some embodiments, power may be supplied from either a DC power input port or an internal 30V supply as shown in circuit element 410. According to other various embodiments, an external power supply is a default power source and the internal 30V supply is only used if an external power supply is not detected by the power supply control circuit in order to conserve the internal 30V power supply.

Because external switch positions on a first transceiver unit 116 and a second transceiver unit 106 account for variant devices and communication protocols, bidirectional fiber optic transmission systems may provide communications between a two wire device at a first transceiver 106 and a four wire device at a second transceiver 116, as shown in system 102, for example. Furthermore, the bidirectional fiber optic transmission system can provide communications between devices from different manufacturers with different connectors and communication protocols, such as an RTS™ manufactured two wire device, and a Clear-Com® manufactured four wire device, for example.

Figure 5:
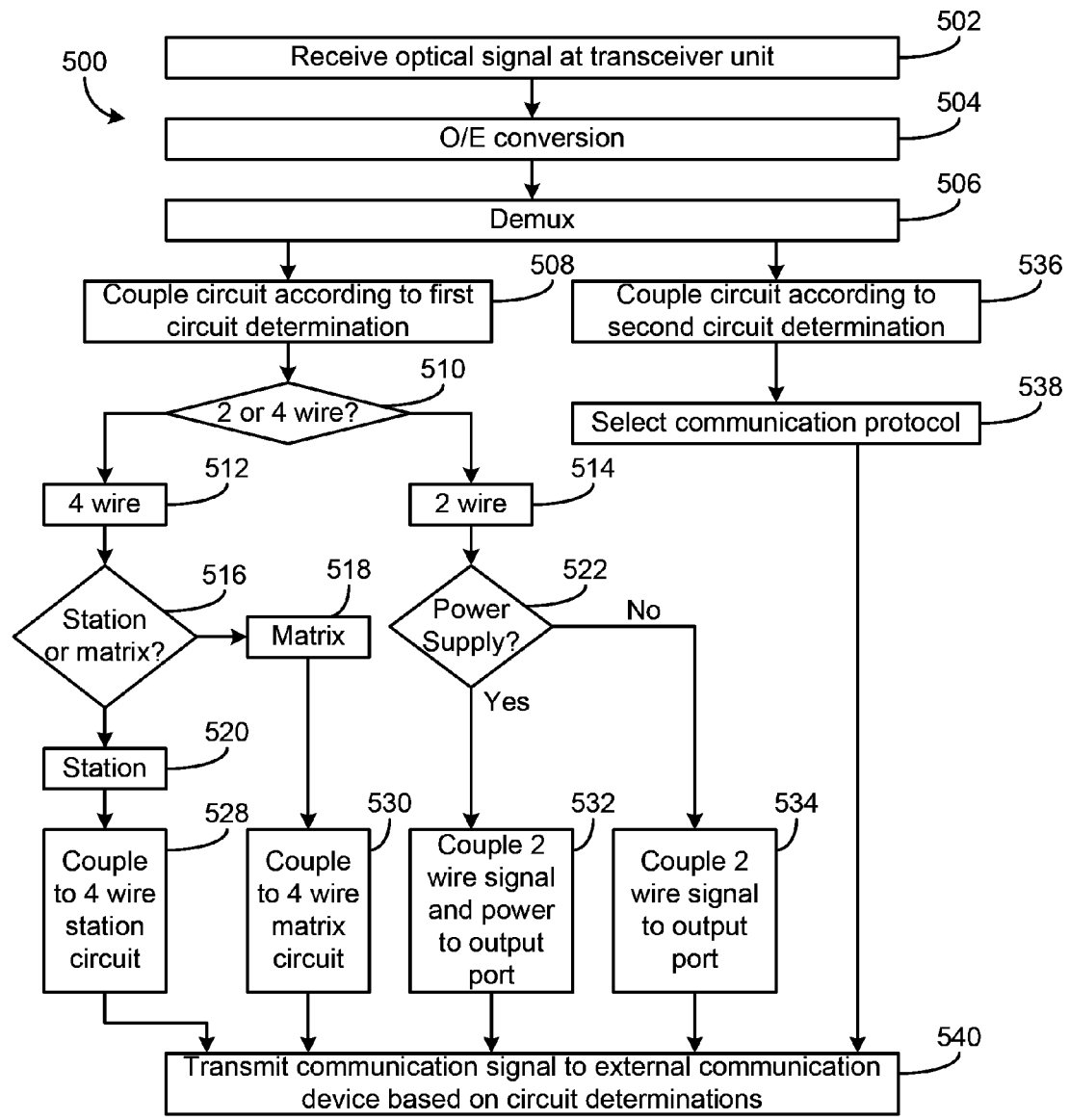
FIG. 5 is flowchart for determining transceiver circuitry based on selected settings.

FIG. 5 depicts a flow chart of a process that takes place at each transceiver unit to provide bidirectional communication between external communication devices of variant manufacturer, power requirements, and device type according to one exemplary embodiment. At step 500, an optical signal is received at a first transceiver unit, such as transceiver unit 106, from a second transceiver unit 116. Transceiver units are designated as a first or second transceiver unit merely to distinguish a transmitting transceiver from a receiving transceiver for the purposes of illustration, accordingly, the terms first and second therefore are interchangeable.

Once an optical signal is received at a WDM 470 at step 502, the optical signal is converted into an electrical signal at a laser detector 460 at step 504. Subsequently, the electrical communication signal is demultiplexed into component audio channels, data and timing signals, for example at demultiplexer 434, at step 506. Steps 510, 516, 522, and 538, for example, are determined in accordance with the control signals from external switches 204, 206, 208, and 224, represented as circuit 430 in FIG. 4A. The control signals from circuit 430 are received at a processing circuit such as the FPGA circuit shown in FIG. 4A, for example. Once the control signals from the external switches are received at the FPGA, the FPGA transmits a circuit control signal based on the external switch control signals, to the audio direction switching and control circuit 496, for example, to determine whether the demultiplexed electrical signal will be coupled to a two wire intercom output circuit 408, or a four wire intercom output circuit 406 at steps 508 and 510. The first circuit referred to in step 508 is the mode switch 206, according to some embodiments while the second circuit referred to in step 536 is the system switch 204, according to some embodiments.

According to one exemplary embodiment, the two switch combinations as shown in elements 302, 304, 306, and 308 determine which output port 440, 442, 450, 452, will be electrically coupled to the audio data from MUX/DEMUX 434. For example, if the control signals from switching circuit 430 send control signals to the FPGA circuit indicating a 2 wire mode is selected (at step 510), a power supply is selected (at step 522), and the system manufacturer is Clear-Com®, (at step 536 and 538), the FPGA circuit will transmit a control signal to circuit 496 coupling the received downstream signal to an I/O port, for example, port 452, compatible with Clear-Com® pin out designations within two wire I/O circuit 408. In addition, FPGA will also send a control signal at step 532 to couple a power supply 410 to the output pin in port 452 designated by a manufacturer such as Clear-Com® as the power output pin.

Referring again to FIG. 5, at step 538, a communication protocol associated with a system selection from switch 204, as RS-422 or RS-485 communication protocol is transmitted to circuit 420 so that the electrical communication signal is translated into the proper pin designations and pin voltages required by a selected communication protocol. According to some embodiments, a particular manufacturer may use a particular communication protocol. For example, tables 310, 312, 314, and 316 show exemplary pin designation required by a communication protocol used by a particular manufacturer. For example, element 304 shows that a Clear-Com® matrix device is selected, which corresponds to a RS-422 communication protocol and the pin designations shown in table 312. Accordingly, by selecting external switch combination shown in element 314, the FPGA receives control signals from steps 510 (from external switch 206), 536 (from with external switch 204), 516 (from external switch 208), and 522 (from external switch 522) and will transmit a control signal based on those control signals to circuit 496 to electrically couple multiplexed signal 454 to a four wire output port in circuit 420 at the pins shown in table 312, according to some embodiments. According to some embodiments, the FPGA will communicate control signals to a mechanism such as a switching mechanism to perform the electrical coupling detailed in steps 528, 530, 532, and 534, for example.

Furthermore, if a four wire mode has been selected at step 510, the FPGA will also communicate a control signal to four wire circuit 420 to communicate a protocol associated with a particular manufacturer such as RS-422 or RS-485. According to some embodiments, the control signal communicated to circuit 420 ensures the electrical communication signal is translated into the proper pin out connections and pin-out voltages. According to some embodiments, the FPGA translates control signals from switching circuit 430 into control signals for circuits 496, 420, and the power supply control circuit by executing instructions such as a computer program code stored in memory using at least one processing circuit located at FPGA 434.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

The operations described in this specification can be implemented as operations performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system for carrying a downstream optical signal and an upstream optical signal on a fiber optic link between a first transceiver unit coupled to a first intercom system and a second transceiver unit coupled to a second intercom system, the system comprising:
   a first transceiver unit that receives an input communication signal from at least one external communication device at an electrical input port;
   a transmitter that converts the input communication signal into an optical signal and transmits the optical signal as a downstream optical signal on a fiber optic link coupled between the first transceiver unit and the second transceiver unit;
   a receiver at the second transceiver unit that receives the downstream optical signal and converts the downstream optical signal into an electrical communication signal;
   a first circuit in the second transceiver unit that determines whether the second transceiver unit couples the electrical communication signal to a two wire intercom circuit or a four wire intercom circuit based on a switch position of a first switch of the second transceiver unit;
   a second circuit in the second transceiver unit that selects a communication protocol for the electrical signal based on a switch position of a second switch of the second transceiver unit;
   a third circuit in the second transceiver unit that determines whether the second transceiver unit couples the electrical communication signal to a four wire intercom station circuit or a four wire intercom matrix circuit in the case that the first circuit determines the electrical communication signal is coupled to a four wire intercom circuit, based on a switch position of a third switch of the second transceiver unit;
   a fourth circuit in the second transceiver unit that determines a power source for an external communication device coupled to the electrical communication signal in the case that the first circuit determines the electrical communication signal is coupled to a two wire intercom circuit based on a switch position of a fourth switch of the second transceiver unit; and
   an output port on the second transceiver unit that outputs either a two wire intercom signal or a four wire intercom signal to an external communication device based on the first circuit determination.

2. The system of claim 1, wherein the power source is one of a battery contained within the exterior surface of the transceiver unit and an external direct current power supply.

3. The system of claim 1, wherein the fiber optic link is a single mode fiber.

4. The system of claim 1, wherein the input communication signal comprises an intercom audio channel.

5. The system of claim 1, wherein the input communication signal comprises a plurality of intercom audio channels time division multiplexed prior to optical to electrical conversion at the first transceiver.

6. The system of claim 5, wherein the input communication signal further comprises a data signal time division multiplexed with the plurality of audio channels prior to optical to electrical conversion at the first transceiver.

7. The system of claim 1, further comprising an input/output port at the second transceiver coupled to the fiber-optic link.

8. The system of claim 7, further comprising a wavelength division multiplexer coupled to the fiber input/output port at the second transceiver for multiplexing the downstream optical signals and the upstream optical signals to permit bidirectional communication on the single fiber optic cable.

9. The system of claim 1, wherein the first circuit determination and the second circuit determination are received as switch control signals at a processing circuit that transmits circuit control signals based on the switch control signals to internal circuits within the second transceiver unit to electrically couple the electrical communication signal to an output port of the second transceiver unit.

10. A method of carrying a downstream optical signal and an upstream optical signal on a fiber optic link between a first transceiver coupled to a first intercom system and a second transceiver coupled to a second intercom system, the method comprising:
   receiving an input communication signal from at least one external communication device at an electrical input port of a first transceiver unit;
   converting the input communication signal into an optical signal;

transmitting the optical signal as a downstream optical signal on a fiber optic link coupled between the first transceiver unit and the second transceiver unit;

receiving the optical signal as a downstream optical signal at the second transceiver unit; converting the downstream optical signal into an electrical communication signal;

coupling the electrical communication signal to one of a two wire intercom circuit and a four wire intercom circuit, determined by a first circuit in the second transceiver unit based on a switch position of a first switch of the second transceiver unit;

determining a communication protocol for the electrical communication signal at a second circuit in the second transceiver unit based on a switch position of a second switch of the second transceiver unit;

determining, at a third circuit in the second transceiver unit, whether the second transceiver unit couples the electrical communication signal to a four wire intercom station circuit or a four wire intercom matrix circuit if the first circuit determines the electrical communication signal is coupled to a four wire intercom circuit based on a switch position of a third switch of the second transceiver unit;

determining, at a fourth circuit in the second transceiver unit, a power source for an external communication device coupled to the electrical communication signal if the first circuit determines the electrical communication signal is coupled to a two wire intercom circuit based on a switch position of a fourth switch of the second transceiver unit; and transmitting one of a two wire intercom signal or a four wire intercom signal to an external communication device based on the first circuit determination.

11. The method of claim 10, wherein the power source is one of a battery contained within the exterior surface of the transceiver unit and an external direct current power supply.

12. The method of claim 10, wherein the fiber optic link is a single mode fiber.

13. The method of claim 12, further comprising a wavelength division multiplexer coupled to the fiber input/output port at the second transceiver unit for multiplexing the downstream optical signals and the upstream optical signals to permit bidirectional communication on the single fiber optic cable.

14. The method of claim 10, wherein the input communication signal comprises an intercom audio channel.

15. The method of claim 10, wherein the input communication signal comprises a plurality of audio channels time division multiplexed prior to optical to electrical conversion.

16. The method of claim 15, wherein the input communication signal further comprises a data signal time division multiplexed with the plurality of audio channels prior to optical to electrical conversion.

17. The method of claim 10, further comprising an input/output port at the second transceiver unit coupled to the fiber-optic cable.

18. The method of claim 10, wherein the first circuit determination and the second circuit determination are received as switch control signals at a processing circuit that transmits circuit control signals based on the switch control signals to internal circuits within the second transceiver unit to electrically couple the electrical communication signal to an output port of the second transceiver unit.

19. A system receiving a downstream optical signal at a transceiver unit coupled to an intercom system, the system comprising:

a receiver at the transceiver unit that receives the downstream optical signal and converts the downstream optical signal into an electrical communication signal;

a first circuit in the transceiver unit that determines whether the transceiver unit couples the electrical communication signal to a two wire intercom circuit or a four wire intercom circuit based on a switch position of a first switch of the transceiver unit;

a second circuit in the transceiver unit that selects a communication protocol for the electrical communication signal based on a switch position of a second switch of the transceiver unit;

a third circuit in the transceiver unit that determines whether the transceiver unit couples the electrical communication signal to a four wire intercom station circuit or a four wire intercom matrix circuit in the case that the first circuit determines the electrical communication signal is coupled to a four wire intercom circuit based on a switch position of a third switch of the transceiver unit;

a fourth circuit in the transceiver unit that determines a power source for an external communication device coupled to the electrical communication signal in the case that the first circuit determines the electrical communication signal is coupled to a two wire intercom circuit based on a switch position of a fourth switch the transceiver unit; and an output port on the transceiver unit that outputs either a two wire intercom signal or a four wire intercom signal to an external communication device based on the first circuit determination.

* * * * *